US009940678B2

(12) United States Patent
Propati et al.

(10) Patent No.: US 9,940,678 B2
(45) Date of Patent: Apr. 10, 2018

(54) AUTOMATED SYSTEMS AND METHODS FOR MANAGING THE PLACEMENT PROCESS FOR SECURING INSURANCE COVERAGE

(71) Applicant: AON Global Risk Research Limited, Hamilton (BM)

(72) Inventors: Joe Propati, Vernon Hills, IL (US); Mark Schmalzer, Saint Charles, IL (US); Amardeep Singh, Chicago, IL (US)

(73) Assignee: Aon Global Operations Limited (Singapore Branch), Singapore (SG)

( * ) Notice: Subject to any disclaimer, the term of this patent is extended or adjusted under 35 U.S.C. 154(b) by 303 days.

(21) Appl. No.: 14/638,789

(22) Filed: Mar. 4, 2015

(65) Prior Publication Data

US 2015/0254780 A1    Sep. 10, 2015

Related U.S. Application Data

(60) Provisional application No. 61/947,779, filed on Mar. 4, 2014.

(51) Int. Cl.
*G06Q 40/08* (2012.01)
*G06Q 40/00* (2012.01)

(52) U.S. Cl.
CPC ............. *G06Q 40/08* (2013.01); *G06Q 40/00* (2013.01)

(58) Field of Classification Search
CPC ........ G06Q 50/00; G06Q 60/00; G06Q 40/08; G06Q 40/00; G06F 17/60
See application file for complete search history.

(56) References Cited

U.S. PATENT DOCUMENTS

| | | | |
|---|---|---|---|
| 2002/0082875 A1* | 6/2002 | Best-Devereux | G06Q 40/00 705/4 |
| 2004/0143464 A1* | 7/2004 | Houle | G06Q 10/10 705/4 |
| 2005/0080720 A1* | 4/2005 | Betz | G06O 40/08 705/38 |

OTHER PUBLICATIONS

Birny Birnbaum, Overview of Lender-Place Insurance Products, Markets and Issues, Jun. 13, 2013, Birny Birnbaum Consulting, Inc., web edition, 1-35 (Year: 2013).*

* cited by examiner

*Primary Examiner* — I Jung Liu
(74) *Attorney, Agent, or Firm* — Gardella Grace P.A.

(57) ABSTRACT

Automated systems and methods for implementing and managing the submission, quote, proposal and binding stages (i.e., placement process) for securing insurance coverage.

20 Claims, 20 Drawing Sheets

| Production-Mapping Tool-Question Mapping | | | | QA Defect Tracker  Section Mapping  Question Mapping  Admin |
|---|---|---|---|---|

Select a Country | USA ▼ | Select Language | English ▼

Add Product/LOB | Manage Template | ACORD Forms | Templates | Associate Forms/Templates | Overflow Template Association | Add Additional Questions | Associate Additional Questions | Template Design | Table Design Search: [_____] GO All Questions

| Expand All / Collapse All | Question ID | Question Name | Field/Display Name | Tooltip |
|---|---|---|---|---|
| ▷ ACORD 101 (2008-01)<br>▷ ACORD 125 (2009-08)<br>▷ ACORD 125 (2011-09)<br>▷ ACORD 125 (2013-01)<br>[1.0] | 755 | Form_Title_A | Commercial Insurance Application - Applicant Information Section | The title of the form, ACORD 125, Commercial Application-Applicant Information Section, is used in the underwriting process for any commercial account submission. The following instructions will pr assistance in the completion the ACORD Commercial Insurance Application Section. 900<br><br>The Applicant Information Section is the foundation on which the ACORD commercial application program is built. This form contains information that is not duplicated on other ACORD commercial application forms. The Applicant Information Section is a required every commercial submission except Workers Compensation, and commercial application is complete without it. |
| ▷ ACORD 125 (2013-09)<br>▷ ACORD 126 (2010-05)<br>▷ ACORD 126 (2011-09)<br>▷ ACORD 127 (2010-05)<br>▷ ACORD 127 (2012-03) | 1 | Form_CompletionDate_A | Date (MM/DD/YYYY) | Enter date: The date on which the form is completed. |
| ▷ ACORD 129 (2009-11)<br>▷ ACORD 130 (2010-05)<br>▷ ACORD 130 (2012-97) | 2 | Producer_FullName_A | Agency | Open searcher and select the appropriate producing agency name. selected, the remaining address information will populate automatically |
| ▷ ACORD 130 (2013-01)<br>▷ ACORD 130 (2013-09) | 3 | Producer_MailingAddress_LineOne_A | Address | The mailing address line one of the producer/agency is to self populate when you have selected the Agency Name from the searcher. |
| ▷ ACORD 130 FL (2002-07)<br>▷ ACORD 131 (2009-10)<br>▷ ACORD 131 (2011-11) | 4 | Producer_MailingAddress_LineTwo_A | Address | The mailing address line two of the producer/agency is to self populate when you have selected the Agency Name from the searcher. |
| ▷ ACORD 132 (2008-09)<br>▷ ACORD 132 NJ (2006-07) | 5 | Producer_MailingAddress_CityName_A | City | The mailing address city of the producer/agency is to self populate when you have selected the Agency Name from the searcher. |
| ▷ ACORD 137 AK (2005-08)<br>▷ ACORD 137 AL (2011-12)<br>▷ ACORD 137 AL (2004-04) | 6 | Producer_MailingAddress_StateOfProvinceCode_A | State | The mailing address state of the producer/agency is to self populate when you have selected the Agency Name from the searcher. |
| ▷ ACORD 137 AL (2010-11)<br>▷ ACORD 137 AR (2013-02) | 7 | Producer_MailingAddress_PostalCode_A | Zip Code | The mailing address postal code of the producer/agency is to self populate when you have selected the Agency Name from the searcher. |
| ▷ ACORD 137 AR (2010-08)<br>▷ ACORD 137 AZ (2008-10)<br>▷ ACORD 137 AZ (2011-07) | 139 | Producer_Contact Person_FullName_A | Contact Name | Enter text: The name of the individual at the producer's establishment that is the primary contact |
| ▷ ACORD 137 CA (2011-07)<br>▷ ACORD 137 CO (2008-01) | 106 | Producer_Contact Person_PhoneNumber_A | Phone (A/C, No, Ext) | Enter number: The producer's contact person's number. If applicable, include the area code ad extension |
| ▷ ACORD 137 CO (2011-06)<br>▷ ACORD 137 CT (2005-11) | 107 | Producer_FaxNumber_A | Fax No. (A/C, No, Ext) | Enter number: The fax number of the producer/agency |
| ▷ ACORD 137 CT (2011-01)<br>▷ ACORD 137 DC (2007-07) | 140 | Producer_ContactPerson_EmailAddress_A | Email Address | Enter text: The producer's contact person e-mail address |

Mapped Products / LOBs
Commercial Property Coverage
Difference in Conditions Coverage
Electronic Data Processing
Equipment Folder
Excess DIC
Excess Liability Coverage
Excess Workers Compensation
Foreign General Liability
General Liability Coverage
Installation Floater

| Production-Mapping Tool-Question Mapping | | QA Defect Tracker  Section Mapping  Question Mapping  Admin |
|---|---|---|
| Select a Country | USA ▼ | Select Language | English ▼ | |
| Add Product/LOB | Manage Template | Associate Forms/Templates | Overflow Template Association | Add Additional Questions | Associate Additional Questions | Template Design | Table Design |

All ACORD Forms/Templates

Search: [____] GO

- ▽ ACORD Forms
  - ☐ ACORD 101 (2008-01)
  - ☐ ACORD 125 (2009-08)
  - ☐ ACORD 125 (2011-09)
  - ☐ ACORD 125 (2013-01)
  - ☐ ACORD 125 (2013-09)
  - ☐ ACORD 126 (2010-05)
  - ☐ ACORD 126 (2011-09)
  - ☐ ACORD 127 (2012-03)
  - ☐ ACORD 129 (2009-11)
  - ☐ ACORD 130 (2010-05)
  - ☐ ACORD 130 (2012-07)
  - ☐ ACORD 130 (2013-01)
  - ☐ ACORD 130 (2013-09)
  - ☐ ACORD 130 FL (2002-07)
  - ☐ ACORD 131 (2009-10)
  - ☐ ACORD 131 (2011-11)
  - ☐ ACORD 132 (2008-09)
  - ☐ ACORD 132 NJ (2006-07)
  - ☐ ACORD 137 AK (2005-08)
  - ☐ ACORD 137 AL (2011-12)
  - ☐ ACORD 137 AL (2004-04)
  - ☐ ACORD 137 AL (2010-11)
  - ☐ ACORD 137 AR (2013-02)
  - ☐ ACORD 137 AR (2010-08)
  - ☐ ACORD 137 AZ (2008-10)
- △ Templates Associate Forms / Template with Selected Product / LOB

| Select Product | Commercial Property Coverage ▶ | 910 |
|---|---|---|
| Unassociated Forms/Templates | | |
| ☐ Form/Template Name | Form/Template |
| ☐ ACORD 101 (2008-01) | Form |
| ☐ ACORD 125 (2009-08) | Form |
| ☐ ACORD 125 (2011-09) | Form |
| ☐ ACORD 125 (2013-01) | Form |
| ☐ ACORD 125 (2013-09) | Form |
| ☐ ACORD 140 (2010-02) | Form |
| ☐ ACORD 140 (2011-10) | Form |
| ☐ ACORD 45 (2009-04) | Form |
| ☐ ACORD 810 (2007-07) | Form |
| ☐ ACORD 810 (2011-10) | Form |
| ☐ ACORD 822 (2009-09) | Form |
| ☐ ACORD 822 (2011-10) | Form |
| ☐ Client OverviewGeneralQuestions Template | Template |
| ☐ Cover Page Template | Template |
| ☐ Final Underwriter Instructions | Template |
| ☐ Invitation to Quote | Template |
| ☐ Property Template | Template |

AUTOMATED SYSTEMS AND METHODS FOR MANAGING THE PLACEMENT PROCESS FOR SECURING INSURANCE COVERAGE

RELATED APPLICATIONS

The present application claims priority to U.S. Provisional Application No. 61/947,779 titled AUTOMATED SYSTEMS AND METHODS FOR MANAGING THE PLACEMENT PROCESS FOR SECURING INSURANCE COVERAGE, which was filed on Mar. 4, 2014. U.S. Provisional Application No. 61/947,779 is hereby incorporated by reference in its entirety.

FIELD OF THE INVENTION

The present technology relates to automated systems and methods for implementing and managing the submission, quote, proposal and binding stages (i.e., placement process) for securing insurance coverage for a client.

DESCRIPTION OF RELATED ART

The current placement process for securing insurance coverage of certain risks is an onerous task for all parties involved. The stages in the placement process typically begin by having an insurance broker identify its client's risks that are to be insured and obtaining other information concerning the client. The broker then creates a submission, which is a document identifying the client and the risks it wishes to insure. The broker delivers the submission to one or more insurance provider underwriters (i.e., the market). To do so, multiple copies of the submission must be prepared, usually from scratch, and tailored for each insurance provider. Once submitted, the broker waits for quotes associated with the desired coverage from the market. Rounds of negotiations with the insurance providers to obtain better quotes for the desired coverage may also occur.

Once an adequate number of quotes are received by the broker, the broker presents them to the client who then accepts one of the quotes. Through additional paperwork, the client becomes bound to the coverage based on the quoted rate. For the most part, the placement process is a manual process, disjointed and in paper-based form. This process is undesirable because it creates long cycle times to get new or renewed insurance coverage. Moreover, paper-based transactions are prone to errors and, due to the time it takes to prepare a submission, may limit the number of insurance providers approached for quotes. This is also undesirable.

Thus, there is a need and desire for implementing and managing a better placement process for securing insurance coverage.

BRIEF DESCRIPTION OF THE DRAWINGS

Specific examples have been chosen for purposes of illustration and description, and are shown in the accompanying drawings, forming a part of the specification.

FIG. 9 is an illustration of the disclosed mapping tool's use of "question mapping" to input information eventually stored as eLabels.

FIGS. 10-12 illustrate example "question mapping" user interface screens displayed in accordance with an embodiment disclosed herein.

FIGS. 13A-13C illustrate example data entry fields and control mechanisms in accordance with an embodiment disclosed herein.

FIG. 15 illustrates an example user interface screen for creating and submitting a submission in accordance with the disclosed embodiments.

FIG. 16 illustrates an example submission output created in accordance with the disclosed embodiments.

FIG. 17 is an example screen used in mapping a new eForm in accordance with a disclosed embodiment.

DETAILED DESCRIPTION

The technology disclosed herein provides automated systems and methods for implementing and managing the submission, quote, proposal and binding stages (i.e., placement process) for securing insurance coverage for a client.

The automated systems and methods disclosed herein allow broking professionals to work with clients to build a submission for an insurance quote on a new proprietary platform, and provide that submission directly, in a digital format, to underwriters. The delivery of that electronic submission is the initial exchange between the broker and insurance carriers. Carrier quotes, binding documents, instructions to bind and final policy and endorsement can also be exchanged in digital format. This new automated exchange eliminates manual data entry, improves the tracking processes associated with managing the substantial exchange of information, and allows reduced response time across the cycle. The end result of this integration is a more efficient and effective risk transfer engagement.

Figure 1:
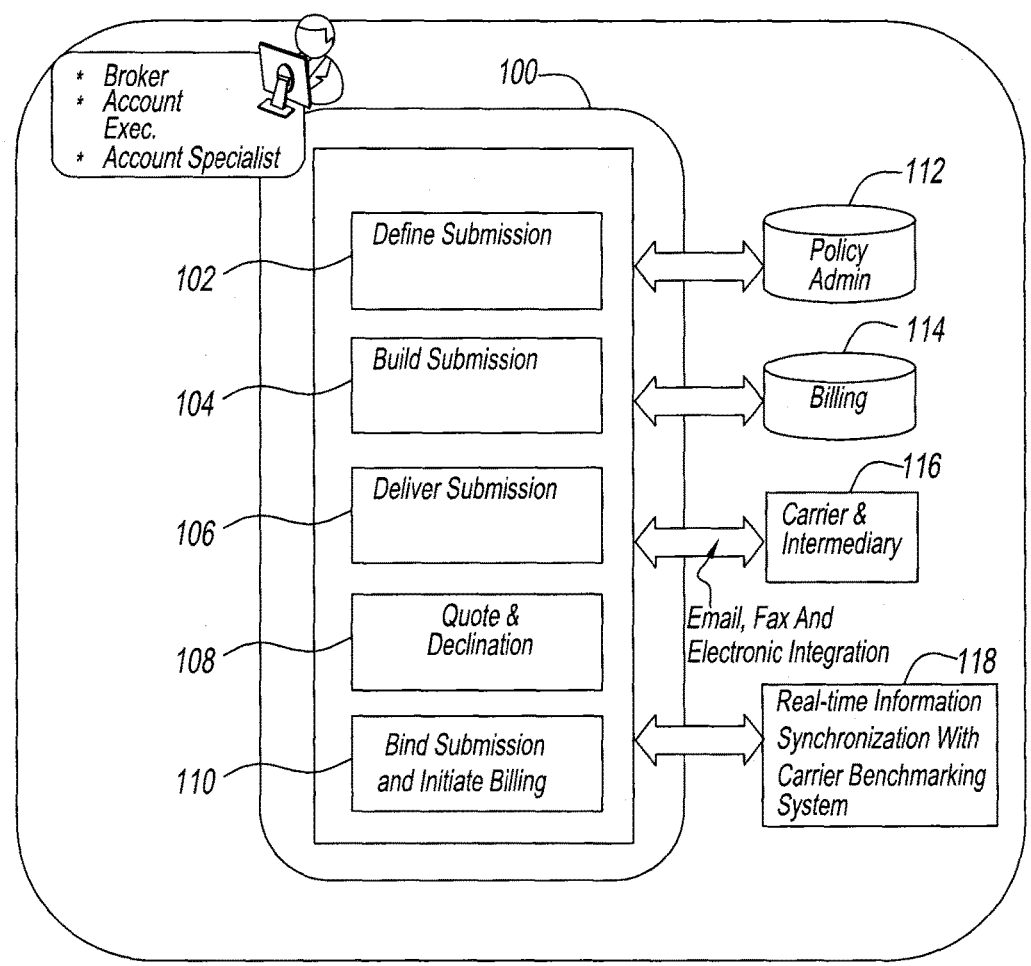
FIG. 1 illustrates a high level block diagram of the automated technique disclosed herein.

FIG. 1 illustrates a high level block diagram of the automated technique disclosed herein. Account executives, brokers and/or account specialists (collectively referred to herein as a "broker" or "brokers") collaborate to gather the client's risk related data and put together a submission quote proposal, which is sent out to various markets to secure insurance coverage for these risks. To do so, the broker accesses a computer application, the submission quote proposal application or platform, and begins collecting the client's information. FIG. 1 shows the use of the application 100, which as described below in more detail, manages the submission, quote, proposal and binding stages of the placement process. Specifically, the application 100 will define a submission 102, build a submission 104, deliver a submission 106 to any entity such as an insurance carrier and/or intermediary 116, manage quote and declinations 108, bind the submission, and initiate billing 110. In one embodiment, the application 100 is part of the broker's desktop platform and integrates with a policy management system and the Microsoft Office suite. As shown in FIG. 1, the application 100 accesses several databases (e.g., policy administration database 112, billing database 114), and a repository of risk and insurance placement information such as e.g., AON's Global Risk Insight Platform® "GRIP," which is identified at 118. AON's GRIP is described in U.S. patent application Ser. No. 13/469,355 titled STATISTICAL ANALYSIS PLATFORM FOR PREDICTING INSURANCE CARRIERS MOST LIKELY TO ACCEPT A PARTICULAR TYPE OF CLIENT RISK and U.S. patent application Ser. No. 13/469,331 titled GLOBAL RISK INSIGHT PLATFORM FOR INSURANCE BROKERS, which are hereby incorporated by reference. AON's GRIP provides web-accessible data to help brokers evaluate which markets will likely have an appetite for a given placement type and which carriers are likely to provide the best value for their clients. An embodiment of application or platform 100 is available as Aon's Carrier Link application. The application 100 communicates via e-mail, facsimile and/or directly with the insurance carriers and/or intermediaries 114 via available digital means (e.g., through a network or Internet connection).

As will become apparent, the application 100 is an integrated platform that allows brokers to build electronic submissions and execute trades with insurance markets, manage the entire new and renewal process from submission development to invoicing. In addition to building submissions, the application 100 allows the broker to clone submissions for multiple carriers, which greatly speeds up the process by reducing the amount of data entry for the multiple submissions. In addition, the broker can track quotes and declinations, prepare proposals and bind client selected quotes using the application 100. Real-time views of all placement activity are also provided using the application's 100 user interface (e.g., web pages). As will be appreciated, the disclosed technology provides a level of flexibility and personalization in a simple and efficient manner.

An individual such as an administrative user or administrator initially identifies the set of risk attributes that need to be captured for submission and creation of each product. The system provides the capability to define the behavior and screen rendering features of these risk attributes.

The risk attribute that is added to the system is identified with a unique ID. Any new risk attribute being configured, if similar to an existing risk attribute, can be mapped to it and inherit its properties. The system allows the user to create variation for a mapped risk attribute, on certain parameters, without changing the basic essence of the risk attribute. For example if the same risk attribute appears on different submission documents with slightly different verbiage, it can be defined once and only slight variation needs to be created for a second instance. All the risk attributes in the system with common core properties are marked as a master attribute. Master attributes can be shared across products. This provides a consistent basis for the insurance brokers to define client's risk profile and to easily input large amounts of risk data.

All the risk attributes required to define a submission are grouped and organized for a product. Variations can be created for a product based on compliance and market needs. The configured product is then published for usage.

Figure 2:
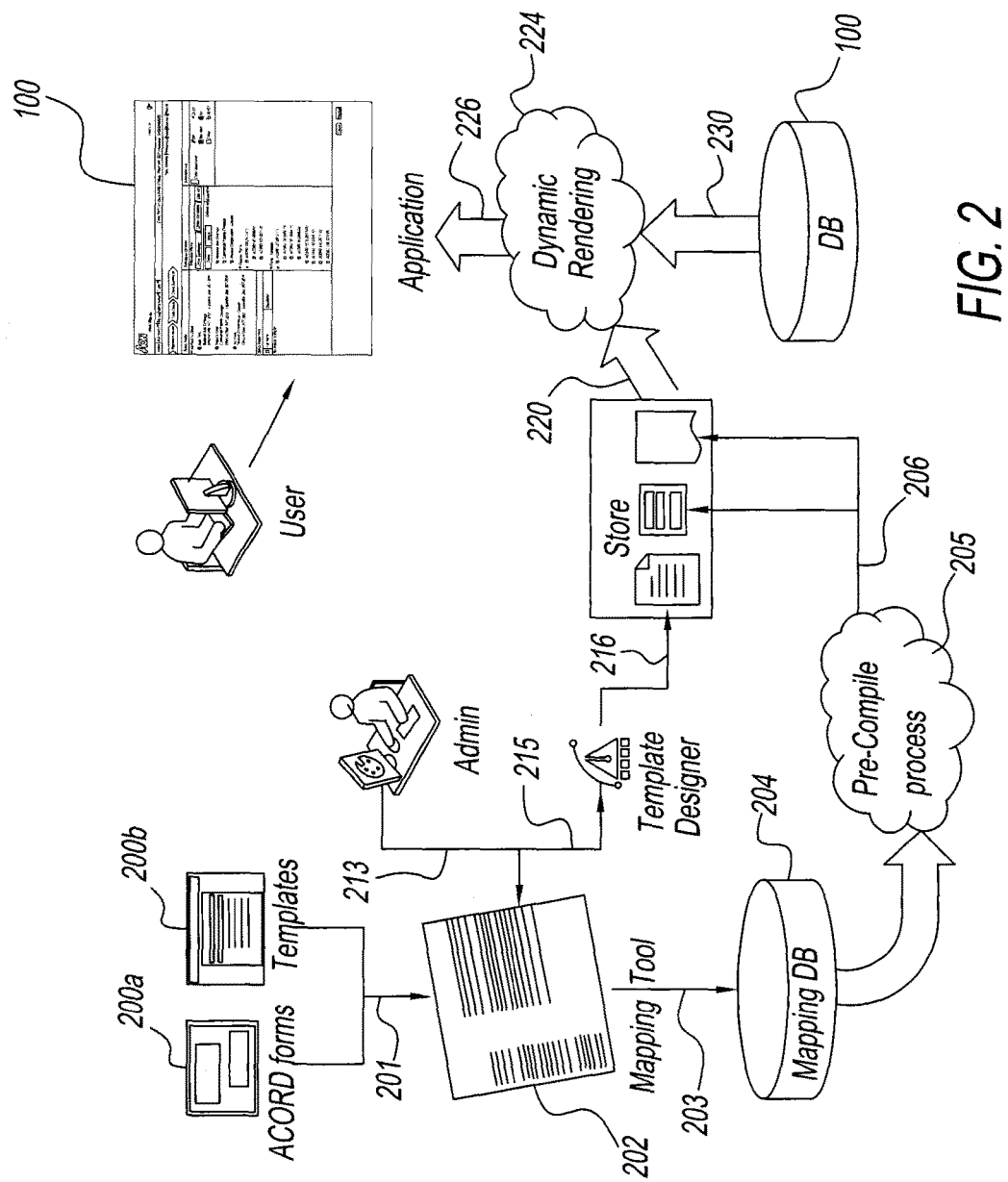
FIG. 2 illustrates an example mapping tool used to configure insurance products for the application disclosed herein, and a dynamic rendering engine used to render the configurations for an eForms viewer in accordance with a disclosed embodiment.

FIG. 2 shows the portal-based system that allows brokers and others to effectively organize, deliver, track and present, submission related information. The system provides capability to configure a product (or line of business) and onboard it into the application 100. During the configuration of the product, a series of steps is performed, as described below. The first step is to identify the forms and templates that are used as submission documents for a product. These documents can be a standard insurance document such as those provided by the Association for Cooperative Operations Research and Development (ACORD) that are referred to as ACORD forms and ACORD electronic forms ("eForms"), which standardized the forms used by insurance brokers, agents, companies, etc. in the United States. ACORD eForms are fillable forms that collect data that can then be extracted for reuse, including the population of other ACORD eForms. ACORD eForms contain a consistent XML (Extensible Markup Language) format, and unique XML tags for each form field, which are referred to as "eLabels." The eLabels are applied consistently across all ACORD eForms, which the embodiments disclosed herein take advantage of.

In addition to ACORD forms, the user can utilize other templates such as a custom or standard Word template such as those created by Aon or a form layout. The configured product is manifested into one of these outputs, any of which a broker can use to work on and subsequently complete a submission for insurance markets. With the exception of custom Aon templates, forms such as the ACORD forms are standard submission forms that allow information to be easily shared with any insurance company. The form or template is electronically fillable and the data is captured from the form or template. The system can easily intake data and surface these forms through the application. Because all output formats are rendered from the same risk attribute set, the crux of submission data captured is constant. As mentioned above, the data captured in a field once will surface in the same field appearing multiple times across various forms. Additionally, data defined in any one format is also available in the other formats.

The system provides a user interface, in the section layout, that is similar to a web page. All the risk attributes and controls are placed on the screen. The page layout, the controls and their behavior are derived from the configurations setup. Additionally, the business rules and validations for the web output are dynamically deduced from the configuration setup. Unique risk attributes may be presented to a broker using a view such as the Form Layout view in a Windows system.

Once the documents for a product are completed, these documents are uploaded as shown in step 201 into a mapping tool 202. This step may be performed by anyone such as an administrator. The mapping tool 202 is a utility, which stores all the configurations. Mapping tool 202 allows a business to configure/change risk attributes and their presentation without elaborate IT (information technology) development. Additional flexibility to rollout these changes in different versions helps manage changes to these attributes.

The risk attributes are identified and saved along with the document in the database as shown in the step identified at 213. If the submission documents are provided by ACORD, then they come along with the risk attributes and properties.

All the attributes are imported into the application. The existing risk attributes become the starting point for configuring the attributes for a product. The process of configuring the attributes is done using the mapping tool 202 in the step identified at 203. All the risk attributes identified in the templates/forms are mapped in the tool to define the display, logical, conditional and business rules of the field. The tool also provides the ability to group and organize the attributes to create a section view. The forms/templates that are mapped against a product are rendered from the template view in the application. The steps involved in configuring the attributes are shown with detail in FIG. 4 and FIG. 5. All the configuration details of the attributes are pushed to a mapping database 204.

Once the required documents are uploaded and the attributes are mapped, the product is published for usage in application 100. A version is created for the published product. Any further changes to the document, risk attributes and configuration of risk attributes are available for use only after creating a new version of the product and publishing it. As soon as the product is published, a job is run to make the version of the product available for use in the application, the precompiling process 205. Precompiling process 205 precompiles the mapped data for a product version and builds a precompiled object with the business rules and the screen rendering details. During the precompiling process 205, two files are generated for a product—the first file is a precompiled form for section view and the second file contains the business rules. The files are uploaded into a temporary document management system with additional metadata properties like product-type, version, and applicable forms/templates. Storing the precompiled forms, in the step identified at 206, enhances the performance of the application while rendering the screen.

The forms/templates also have to be designed and uploaded to be accessed in the application. The ACORD forms are also precompiled to be rendered in the application in a viewer such as Aon's custom developed viewer. ACORD publishes the submission forms in Extensible Forms Description Language (XFDL) format. The job precompiles the XFDL file into intermediate format rendered by the viewer. The intermediate format file is also stored in the same document management system with other files. The word submission document needs to be designed into a template to be rendered in the application. The step identified at 215 includes the process of designing the word template based on the risk attributes mapped in the mapping tool and the Word document. The mapping application provides a tool to the administrative user or administrator that can be used to design the submission templates. The designed template is also uploaded to the document management system.

When the user accesses a product in the application to complete a submission, the three views of the application: section view, forms view, and template view are rendered. Step 220, the precompiled object, the business rules and the data are combined together to render the output.

Figure 13A:
Figure 13B:
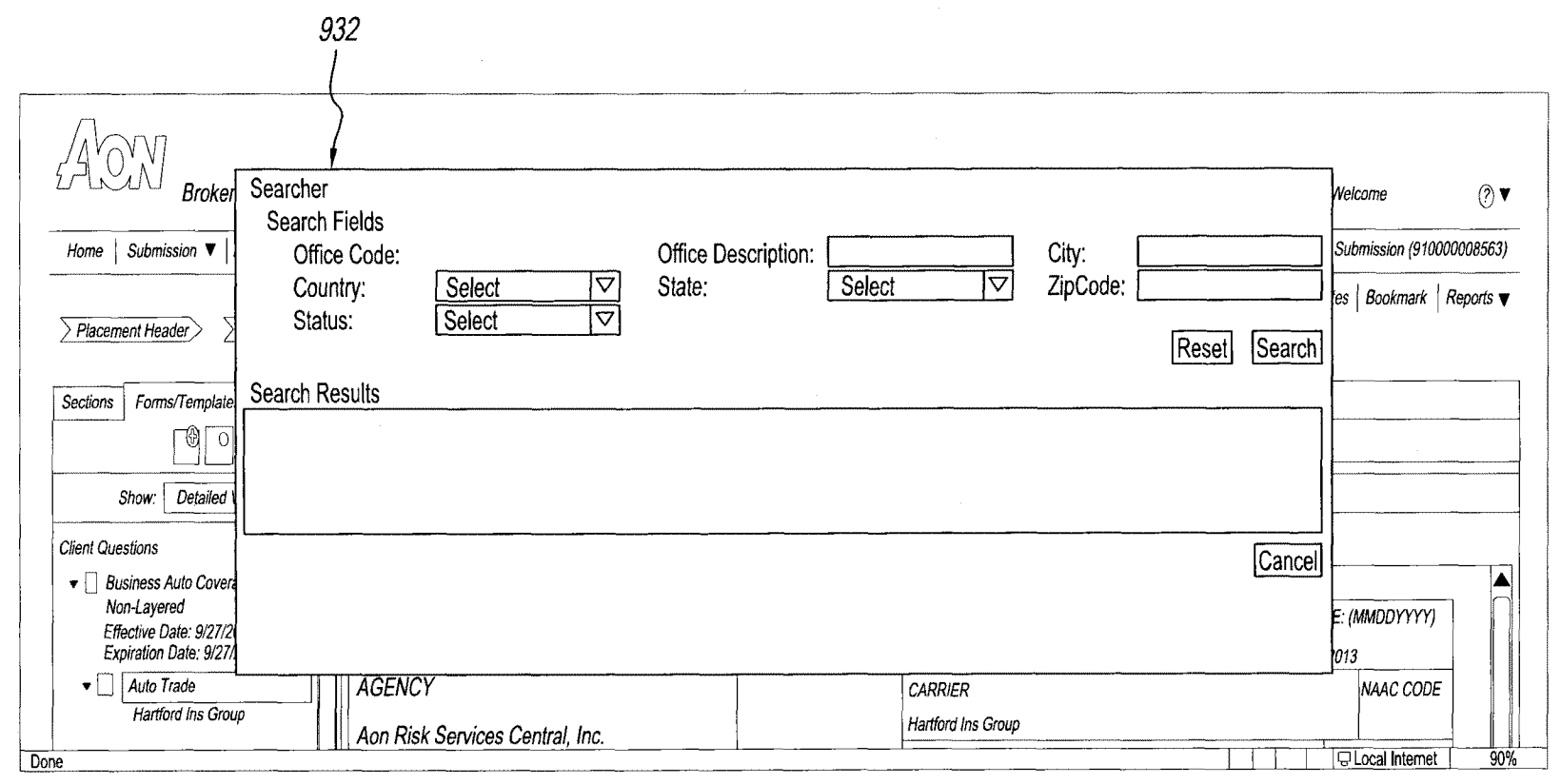
Figure 13C:
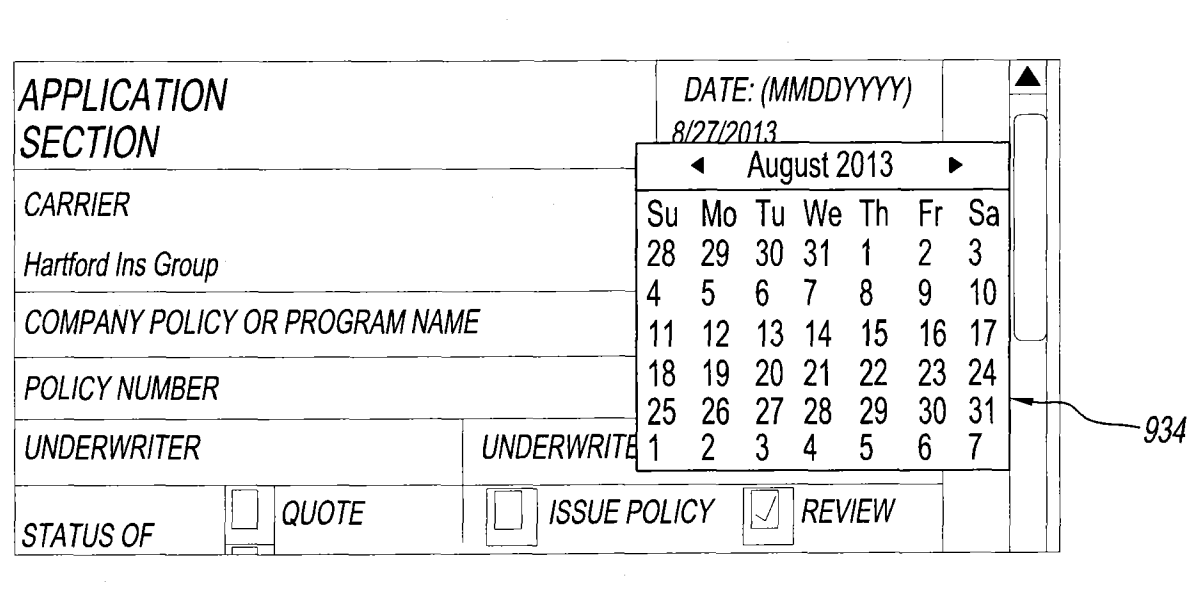

Dynamic rendering engine 224 is used to render the configurations for the eForms viewer 228 in accordance with a disclosed embodiment. The eForms/eLabels 200a can be configured to surface specific controls like custom dropdowns, date controls and custom searchers for seamless integration with backend systems (an example of these control mechanisms are illustrated in FIGS. 13A-13C). The mapping tool 202 associates the products/categories identified with Table I to the appropriate eForms 200a. The information is stored in the mapping tool database 204. As can be appreciated, the mapping tool utility 202 provides the application 100 with the flexibility and adaptability to meet the changing needs of the markets and submission requirements. The dynamically rendering engine 224 uses the information generated by the mapping tool 202 to render the mapping tool configurations in the application's eForms viewer and/or traditional web-based forms (i.e., section view).

As noted above, the three modes of the dynamic rendering engine 224 may include: (1) section view, (2) forms view, and (3) template view. Risk attributes in section view are classified into different sections and similar attributes are further grouped under different sub groups. For forms view, risk attributes in the dynamic rendering engine are rendered on an ACORD form. ACORD provides XFDL version of the ACORD form which is first converted into Extensible Application Markup Language (XAML) using an offline tool that is then rendered on the trade screen. For the template view, risk attributes in the dynamic rendering engine are rendered on standard word templates. These templates may be pre-designed by the business team and uploaded onto the mapping tool.

In one embodiment of a method for implementing and managing a placement process for obtaining insurance coverage, the method may comprise: electronically defining at least one product for a submission quote proposal; capturing data for a set of risk attributes from at least one form or template; electronically grouping and organizing the set of risk attributes such that the risk attributes are mapped to provide a mapped electronic form; rendering, in a user interface on a display device, the mapped electronic form in at least one view; and electronically capturing the set of risk attributes, by a computing device, and saving the data with a unique identification in an electronic database in an application without saving the mapped electronic form. Because the mapped electronic form is not saved, the application such as application 100, operates much more rapidly than if the data was saved as a document such that the functioning of the application is improved. Each time that a user accesses application 100 to make changes to the risk attributes, the risk attributes are saved with the unique identification in the electronic database. After the risk attributes have been captured, then the computing device is used to generate at least one electronic submission request containing the mapped electronic form and requesting a quote for insuring at least one product based on the submission quote proposal. The computing device is then used to deliver the at least one submission quote proposal to one or more organizations capable of insuring the one or more risks.

Figure 3:
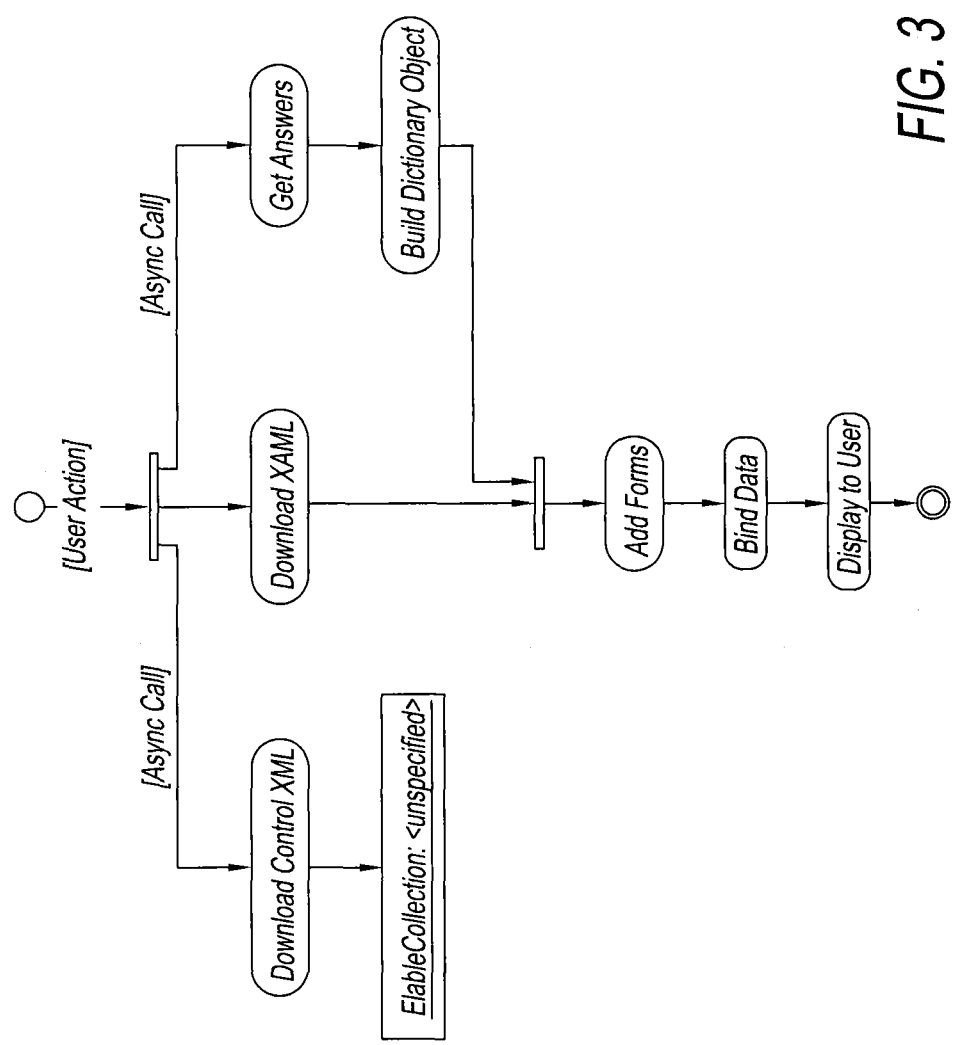
FIG. 3 depicts the rendering of a screen.

An example of the rendering of the screen is shown in FIG. 3. The first step, generating section view controls includes the following sub-steps: creation of controls, finding primary sections, creating user interface elements, adding the created elements to a control collection, and creating sub-sections for the primary section. After the section view controls have been generated, the second step involves rendering the sections. The final step involves retrieving and binding answers. After the dynamic rendering activity shown in FIG. 3 is completed, the merged file is then loaded on the user screen to generate the output. The user completes the submission by answering the risk attributes in one of the three outputs: section view, forms or template. The answers for the risk attributes provided by the user are then pushed to the application database.

Figure 4:
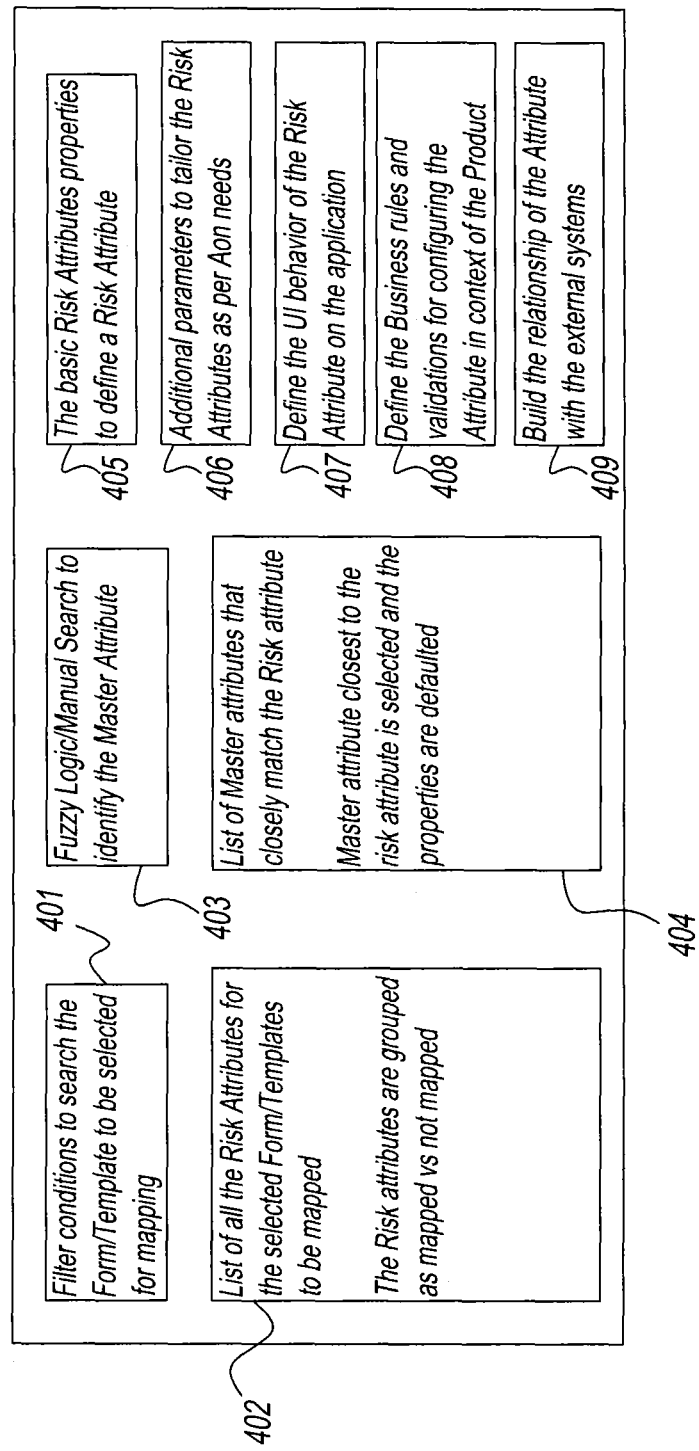
FIG. 4 illustrates a mapping portal screenshot used to define risk attributes associated with forms/templates in an embodiment of the technology.

FIG. 4 illustrates a mapping portal screenshot used to define risk attributes associated with forms/templates in an embodiment of the technology. The mapping function relates to configuring risk attributes that are part of the submission document, such as a Word template or an ACORD form, that is delivered to an insurance carrier for a quote. The submission documents include various risk attributes that allow the carrier to determine insurance pricing for the risk.

The mapping portal screenshot, shown in FIG. 4, is divided into several sections. The user of the screen first identifies the form/template to be configured. Section 401 provides the user with filter conditions to derive the form/template to be configured. All the risk attributes associated with the selected form/template are listed in section 402. The user selects one risk attribute at a time to configure the behavior. The section allows the user to categorize the risk attributes as mapped/unmapped for a form/template. This allows the user to intermittently save the completed work and return back later.

The risk attribute to be mapped can reuse the configuration already defined for a different risk attribute, if the attribute is the same and repeated again or if the base properties are the same. Sections 403 and 404 provide the functionality to search for an existing attribute. As soon as the user selects the attribute in section 402, a fuzzy logic runs to determine if a similar attribute has been mapped earlier. The results of the logic are shown in section 404 with the confidence of the match. At this point, the user can ignore the fuzzy logic search and go for a manual search and narrow the search results. The selected attribute configurations will be defaulted in the left most section and will be the starting point for mapping the risk attribute.

Sections 405 to 409 capture different property details of the risk attribute that will be used to render the attribute on the application. Section 405 captures the properties required to define the risk attribute for the user on the application and uniquely identify the risk attribute. Section 405 also captures the data properties of the risk attribute. Section 406 gives additional properties to tailor the attribute and define the field behavior on the application. Using section 407, a user can define the user interface (UI) behavior of the attribute such as position, layout, control type, etc. Section 408 can be used to define the business rules, validation, and conditional behavior of the attribute in context of the application. The attribute can be mapped with attributes of other internal systems to push or pull the data during integration. Mapping with one or more external systems can be completed in section 409 by building the relationship with the external systems.

Figure 5:
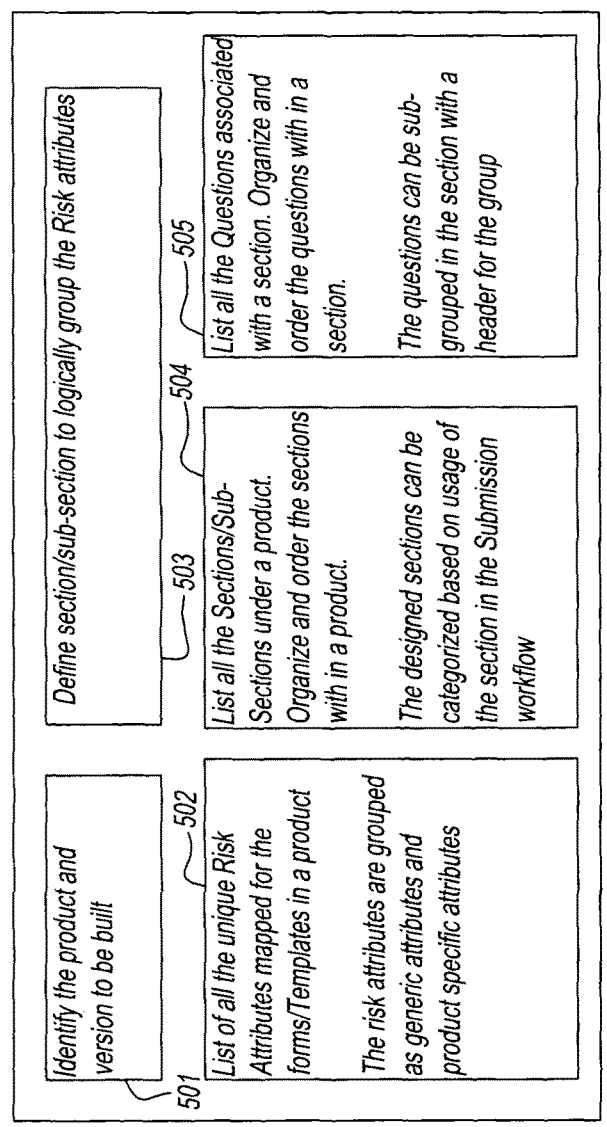
FIG. 5 illustrates a product builder and provides a section view portal screenshot used to build the product in an embodiment of the technology.

FIG. 5 illustrates a product builder and provides a section view portal screenshot used to build the product in an embodiment of the technology. The product builder screen is used to configure and organize the risk attributes for a product. Section 501 provides the user with filter conditions to derive the product to be configured. All the unique risk attributes associated with selected product are listed in section 502.

Section 503 provides the user with an interface to build a section or a sub-section for logical grouping and organization of risk attributes. The attributes that are to be included in a section are moved from section 502 to section 504. The attributes in section 504 can also be organized and re-ordered. Section 505 enables question to be listed with a section, the questions to be organized and ordered within a section. Section 505 also enables questions to be sub-grouped in the section with a header for the group.

The user can also build a general section during the building of product sections. The general section can be reused across products. The finalized product is then published to be rendered on the application.

Figure 6:
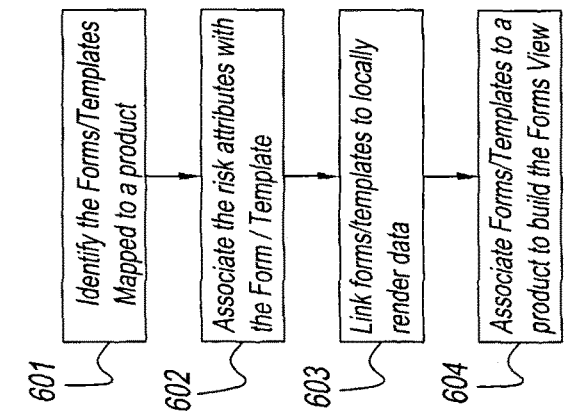
FIG. 6 illustrates an exemplary process that may be used to build the template view of the application, in accordance with an embodiment of the technology.

FIG. 6 illustrates an exemplary process that may be used to build the template view of the application, in accordance with an embodiment of the technology. FIG. 6 illustrates a process that may be used to onboard the forms/templates and build the template view for the application for a product. The process shown in FIG. 6 may be performed by an administrative user or administrator to setup the forms/templates.

The submission forms/templates documents are identified and uploaded into the mapping application as shown at 601. All the risk attributes captured in the template are added in the mapping tool. The risk attributes are then associated with the linked templates as shown at 602.

The user can logically link templates based on the data capture logic as shown at 603. This will enable the data to overflow from one form to another and conditionally enable forms based on the data captured. The last step in the process is map all the forms/templates required to complete a submission for a product. The mapped templates for a product will be published along with section view.

Figure 7:
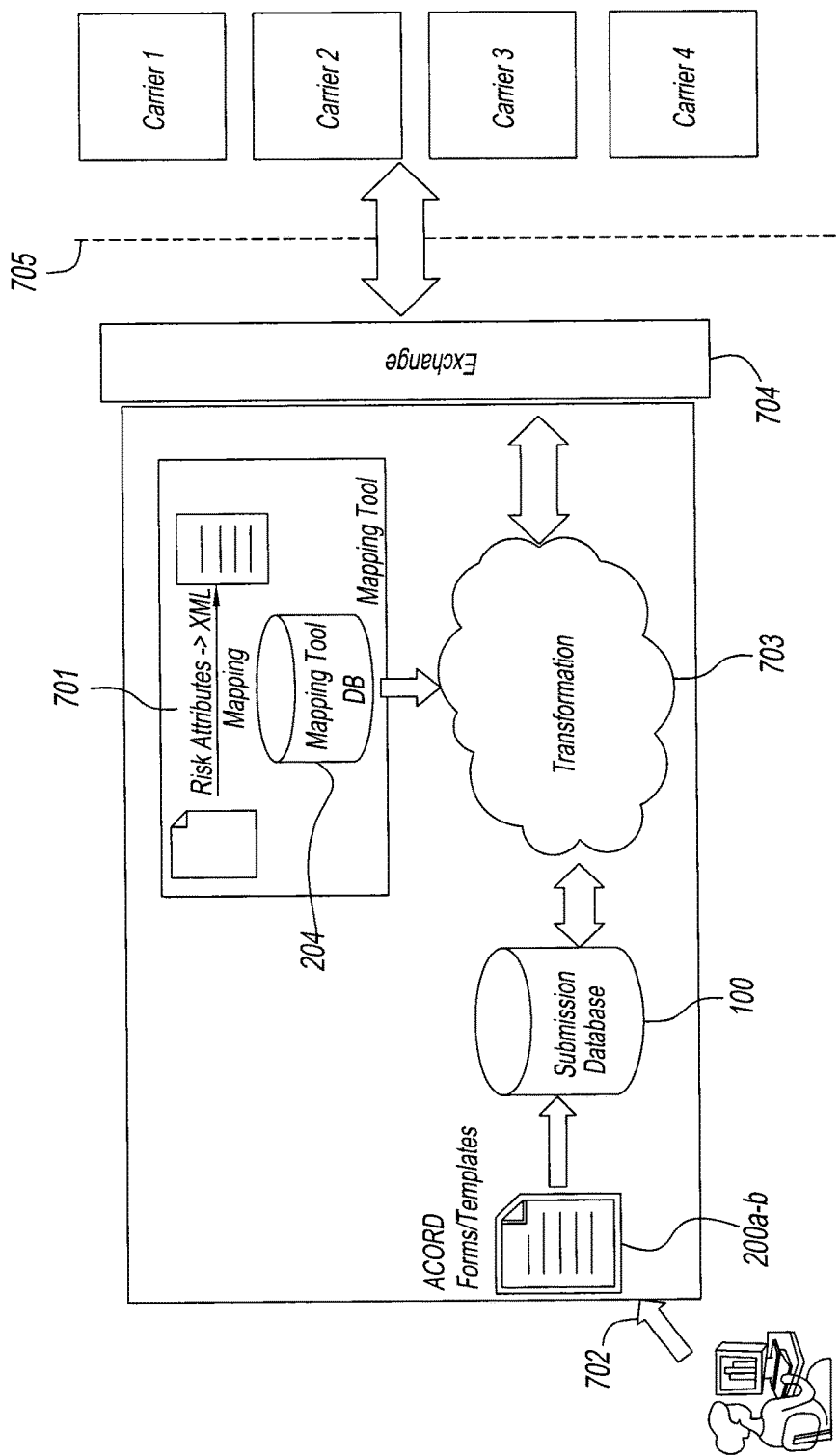
FIG. 7 illustrates an exemplary process used for electronic carrier exchange for the submission process.

FIG. 7 illustrates an exemplary process used for electronic carrier exchange for the submission process. The first step, identified at 701, is to map the risk attributes to the submission extensible markup language (XML) file. The ACORD XML specifications are used as the standard for communication between the carriers and the exchange 704. The mapping of the risk attributes and the XML element is maintained in the mapping tool database 204. The standard XML request and response required for various submission stages are created in the mapping tool database 204. The mapping tool database 204 also gives the capability to create a variation of the XML objects mapped based on the specific carrier requirements.

The user completes the submission by answering the risk attributes, through the application as shown in the step identified at 702, and the data gets stored in the database 100. Once the submission is completed and is ready for delivery the broker will initiate the delivery process.

All the submission details that are captured as part of the submission are transformed into ACORD XML files as shown in the step identified at 703. The transformation process applies the business rules and attribute mapping setup to create the request/response XML files for the carrier. The XML files are then pushed to the exchange server. Based on the exchange logic used in the electronic exchange 704, in the next step identified at 705, the submission is electronically transmitted to one or more carriers. This integration also facilitates the response(s) from the carrier(s) and consumes it into the application.

The electronic exchange 704 provides the advantage of effective delivery mechanism for submissions. This also cuts down the rekey effort on carrier(s) and when the messages are exchanged. This process can also facilitate automatic quote process and increase the productivity and cut down the overall submission processing time.

Figure 8:
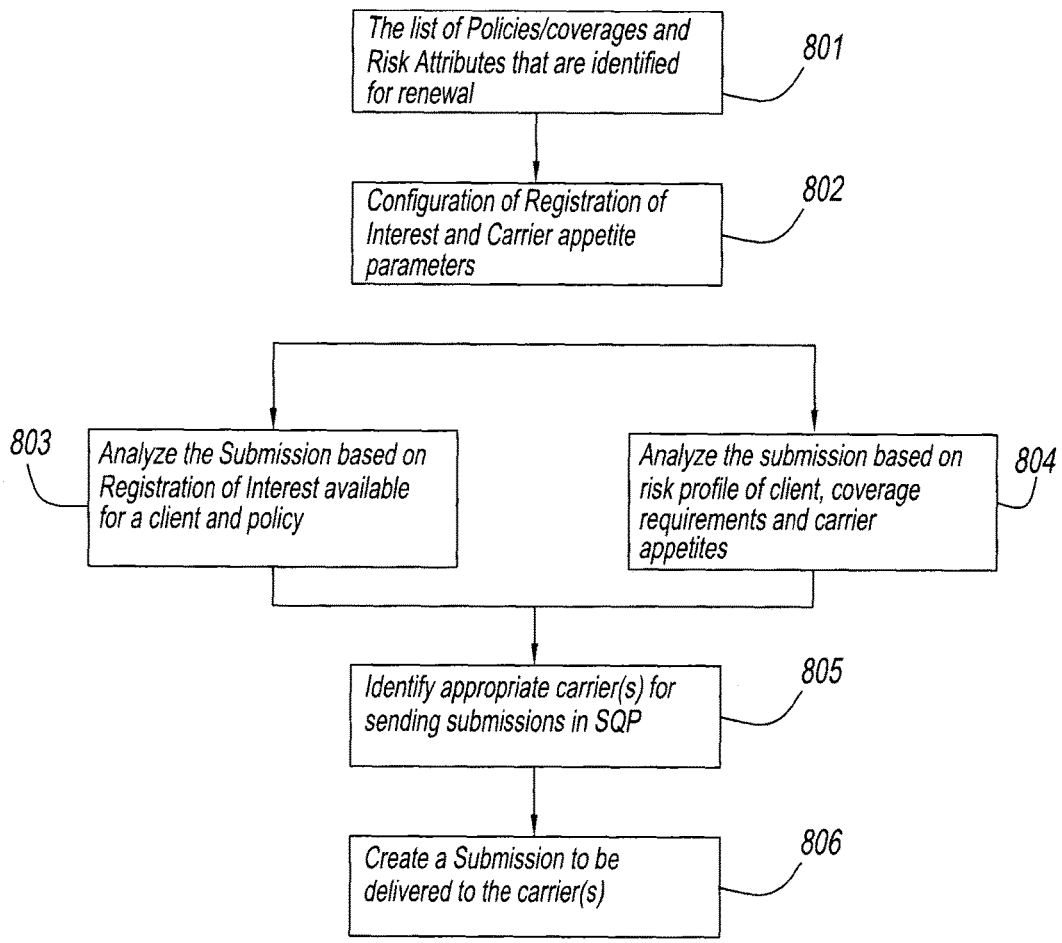
FIG. 8 illustrates an exemplary process to identify the carrier appetite to participate in the submission process and for routing of the renewal submissions.

FIG. 8 illustrates an exemplary process to identify the carrier appetite to route the renewal submissions to the carriers. More particularly, FIG. 8 illustrates the process to identify carrier appetite to participate in the submission process. The first step is identified at 801, which involves identifying the policies that are expiring and need to be submitted for renewal. The application provides an interface to setup the Registration of Interest by the carrier on the expiring policies. The application also provides an interface to setup the carrier appetite parameters based on which the submission is analyzed, and appropriate carrier(s) are identified as shown at 802.

In the step identified at 803, all the renewal submissions with the Registration of Interest are identified in the application. A submission is created for all the carriers who have expressed interest for underwriting the client's risk.

In the step identified at 804, submissions are analyzed by matching the client's risk profile and coverage requirements with the appetite of the carrier(s). In the next step, which is identified at 805, the appropriate carrier(s) are identified based on the analysis in the steps referenced at 803 and 804.

The submissions are prepared by the brokers by adding additional information for the risk attributes. In the final step, identified at 806, the submissions are delivered to one or more carrier(s).

Figure 14:
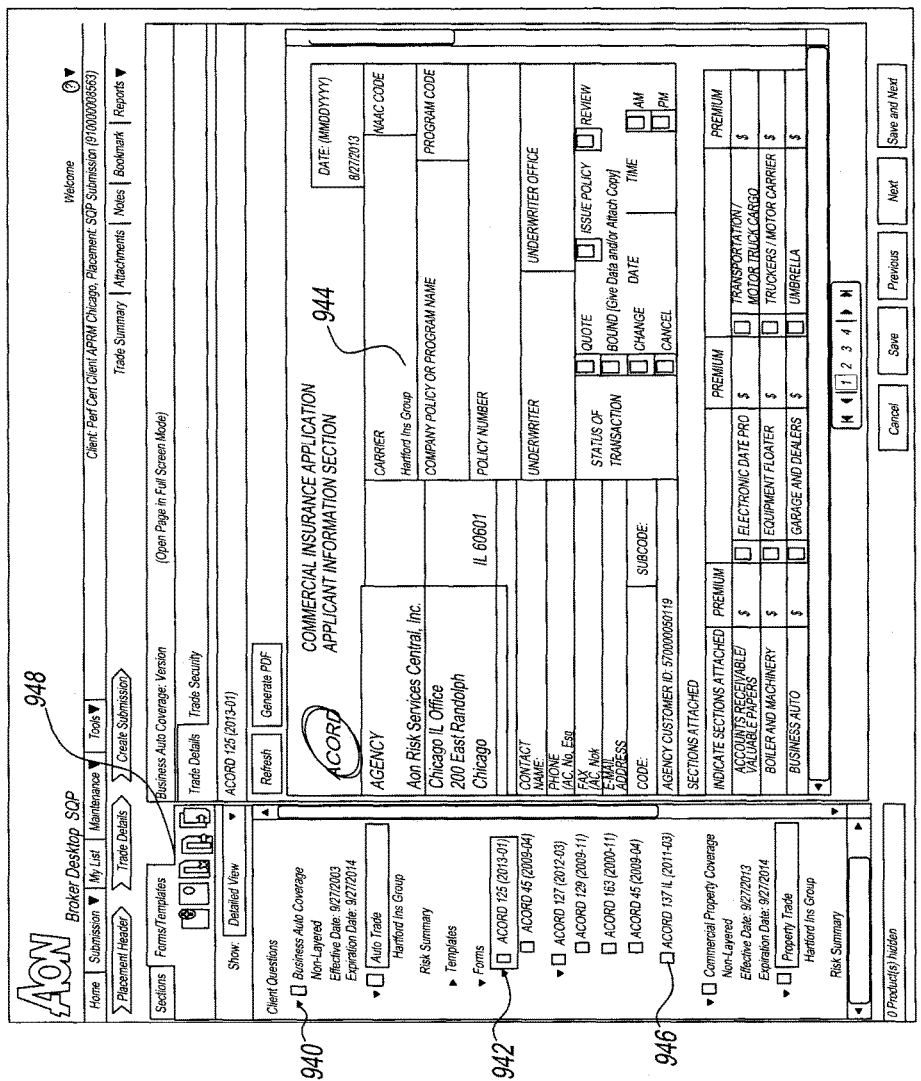
FIG. 14 illustrates an example user interface page of the eForms viewer disclosed herein.

As described above, data is captured for a set of risk attributes from at least one form or template. Some of the risk attributes have defined behavior and defined screen rendering features such that these risk attributes are selected in a viewer from a set of options. In one embodiment, an eForms viewer is provided (an example page output by the viewer is shown in FIG. 14), which is used to surface ACORD eForms and eLabels to the broker to facilitate the submission creation process. The broker/user can decide to fill the information in the editable ACORD eForm or its equivalent "section view." As discussed below in more detail, the input of data into the eForms is controlled by using custom searchers, custom dropdowns and date controls on the viewer. The eLabels associated with the eForms are used as the foundation for initiating the configuration of the insurance products accessible via the application 100. As discussed above, since each ACORD eLabel is uniquely mapped, certain eForm information need only be entered once and then it can be reused and rendered in other ACORD eForms. ACORD eForms are dynamically rendered in the application 100 (via a web based XFDL viewer referred to herein as the "eForms viewer") based on the product configuration done in a mapping tool. In addition, built-in rules are provided to handle overflow of information/fields used in the ACORD eForms.

The eForms viewer supports the following features: (1) two-way data integration (the data entered into an eForm is saved in a relational database); (2) pagination and scrolling; (3) conditional logic; (4) versioning of ACORD eForms; (5) tooltip; (6) output options (e.g., PDF output, printing to a physical printer, ACORD XML format); and (7) searchers, dropdowns, calendar, check boxes etc. for master data entry. Table I below lists exemplary insurance products and product categories that are associated with ACORD eForms in the disclosed embodiments. It should be appreciated that the items in Table I are merely examples and that the disclosed embodiments can use ACORD eForms for more insurance product/product categories if desired.

TABLE I

Exemplary Products and Product Categories for eForms

| Product Categories | Product |
| --- | --- |
| Property | Commercial Property Coverage |
|  | Equipment Breakdown |
| Casualty | General Liability |
|  | Workers Compensation |
|  | Business Auto |

TABLE I-continued

Exemplary Products and Product Categories for eForms

| Product Categories | Product |
| --- | --- |
| Financial | Crime |
|  | ERISA Bond |

FIG. 9 is an illustration of the mapping tool's use of "question mapping" to input information eventually stored as eLabels. As mentioned above, the eLabel data is the foundation for initiating the configuration of the insurance products available for the application 100. eLabel descriptions 900 are provided to the user. The descriptions 900 associate e.g., a question ID, question name, field/display name and "tooltip" (i.e., tip as to what the eLabel information is all about). It should be appreciated that the unique eLabel definitions 900 reduce duplication during the mapping, which enables the quick configuration of the desired products. The ACORD eForms 902 are uploaded into the mapping tool 202 along with the eLabels. Once the data definition and control behavior of an eLabel is defined, the eLabels can be reused for other ACORD eForms and/or insurance products. The data can be stored in the database 204.

Figure 11:
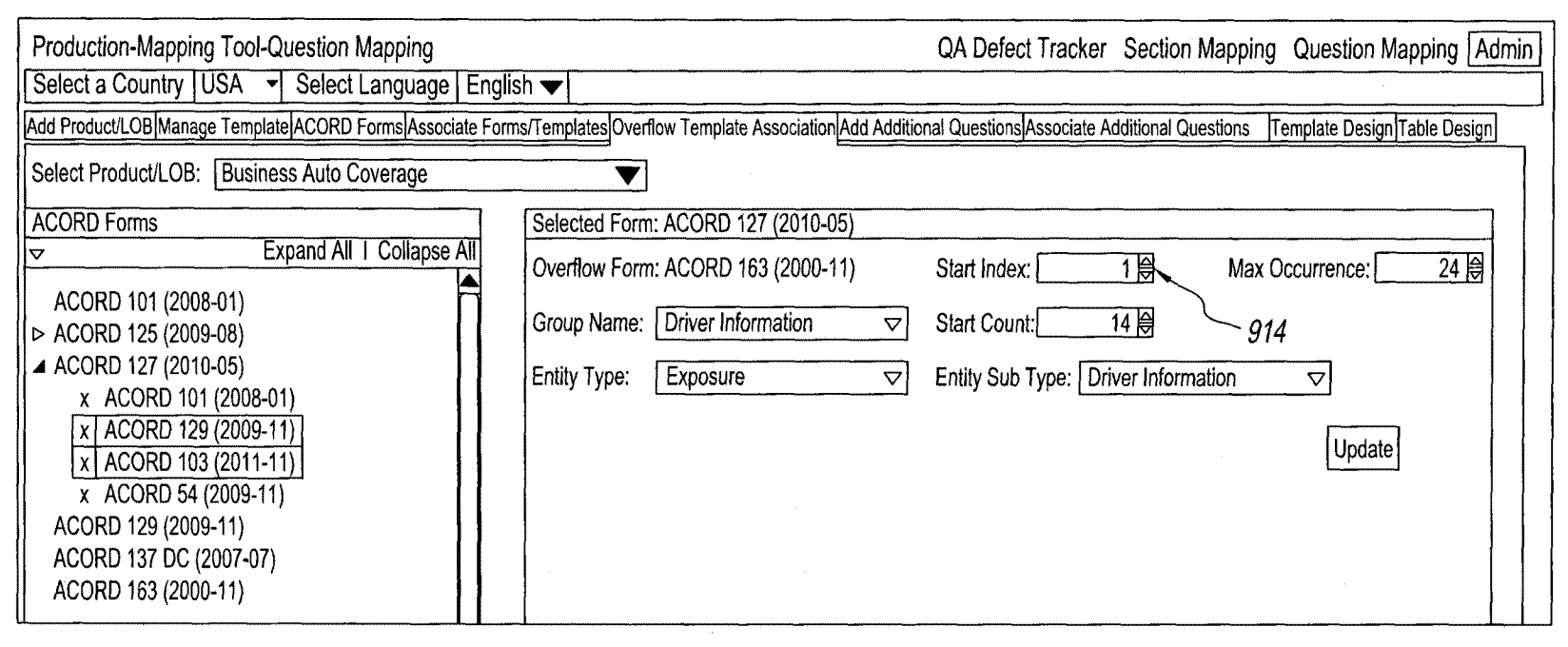

The application 100 can display a list of products to be enabled. The ACORD eForms related to the products are mapped based on ACORD guidelines. As shown in FIG. 10, the ACORD eForms are uploaded into the mapping tool 202 and associated with the relevant products (see e.g., field 910 of FIG. 4). As can be seen in FIG. 11, primary and overflow ACORD eForms 914 are associated with the products to provide a complete set of forms 912 for a product. The data overflow logic is configured in the mapping tool 202. This logic enables automatic rendering of overflow forms or fields when data overflows from the primary form (e.g., when a field only has 3 entry lines, but the user has 4 pieces of information for that field, a new form or field is rendered to accept the additional information).

Figure 12:
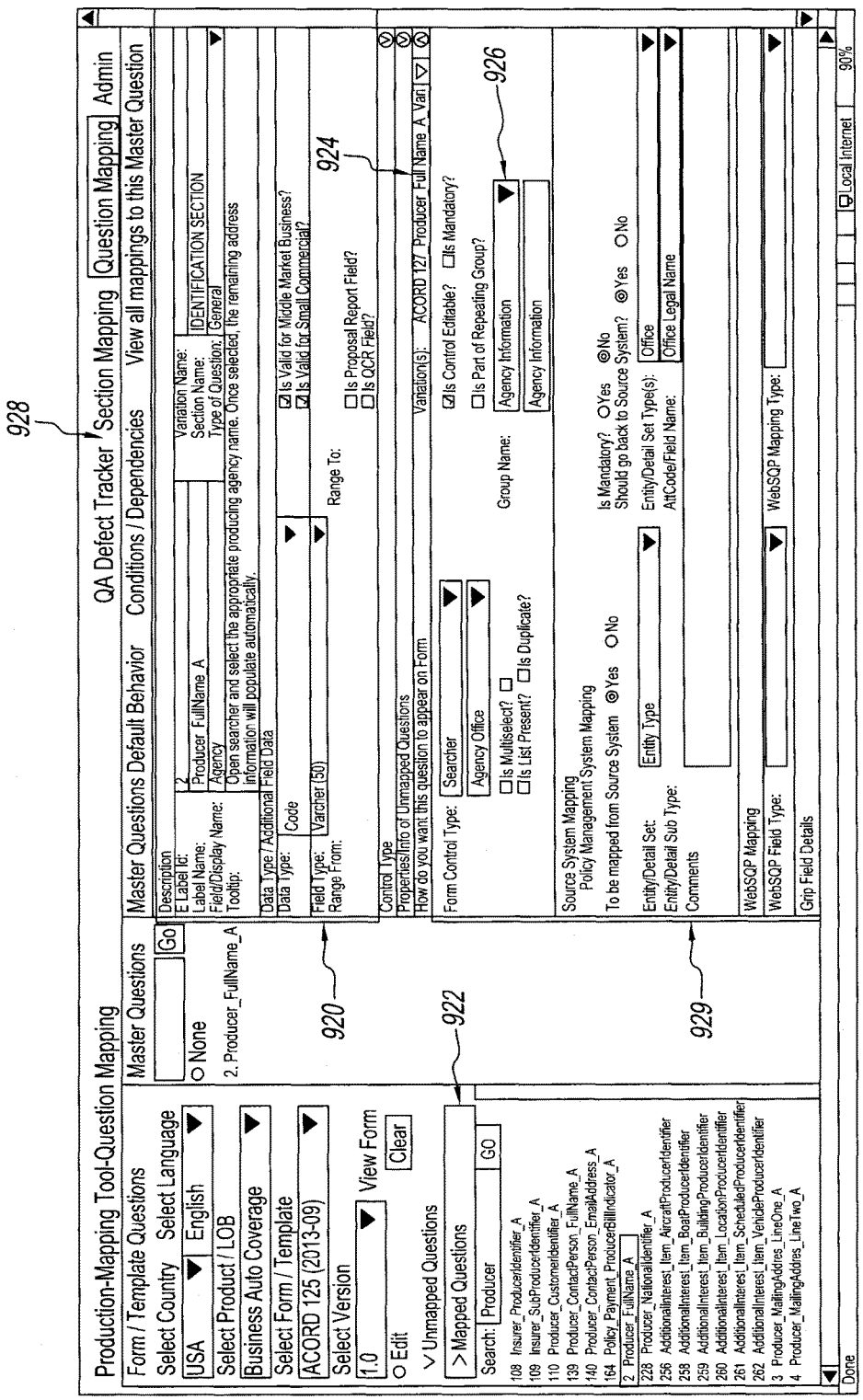

FIG. 12 illustrates more "question mapping" used by the mapping tool 202. As can be seen, ACORD defined e-Label properties 920 are re-used by the Application 100. All of the questions (i.e., eLabels) that need to be answered for completing submission for a product are identified in a list 922 shown e.g., as "mapped questions." Additional mappings 924 are defined to tailor the questions per the user's needs. In one embodiment, the default controls can be overridden with custom dropdowns/custom searchers and date controls (a dropdown is shown in field 926). Conditional logic 928 (shown as "conditions/dependencies") can be defined as well. Moreover, business rules and validations for completing configurations are defined (see e.g., field 929).

As mentioned above, the eForms viewer disclosed herein is designed with the ability to display custom controls and custom searchers to ensure data integrity of its backend systems. For example, the "Client Name" can only be filled in using a custom searcher. The ACORD "tooltips" guide the brokers as they create the submission, an example of which is shown in field 930, as depicted in FIG. 13A). In one embodiment, a tooltip (e.g., message or instruction) will be displayed when the user places the cursor over one of the fields. As can be appreciated, better data integrity is provided through the use of the disclosed interface which, includes searchers 932 (FIG. 13B), calendar control entries 934 (FIG. 13C) and dropdown/pop-up menus (shown in FIG. 12).

FIG. 14 illustrates an example webpage of the eForms viewer disclosed herein. To initiate a submission for a client, a broker selects the applicable product or products from a list 940. A list 942 of the fillable ACORD eForms associated with the selected product or products are presented for capturing the client's risk information. As mentioned above, the eForms viewer user interface provides the user the ability to use searchers, dropdowns, and calendar controls to complete the form accurately. In the illustrated embodiment, the user can select the carrier/markets (field 944) using a custom searcher. The broker/user has the ability to tailor the list 942 of ACORD eForms typically used for submissions to a specific market by selecting more eForms from a list 946. Once the client information is captured for one market, the submission data can be cloned for additional markets using a clone selection 948.

Figure 15:
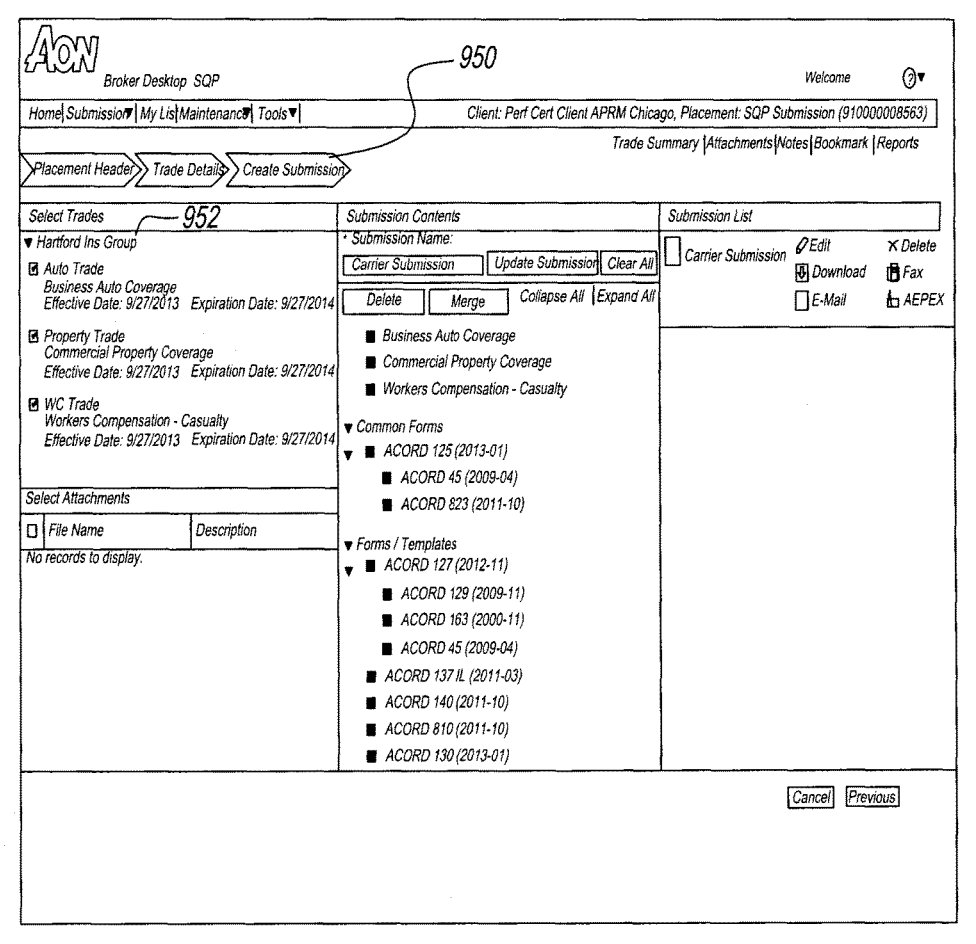
Figure 16:
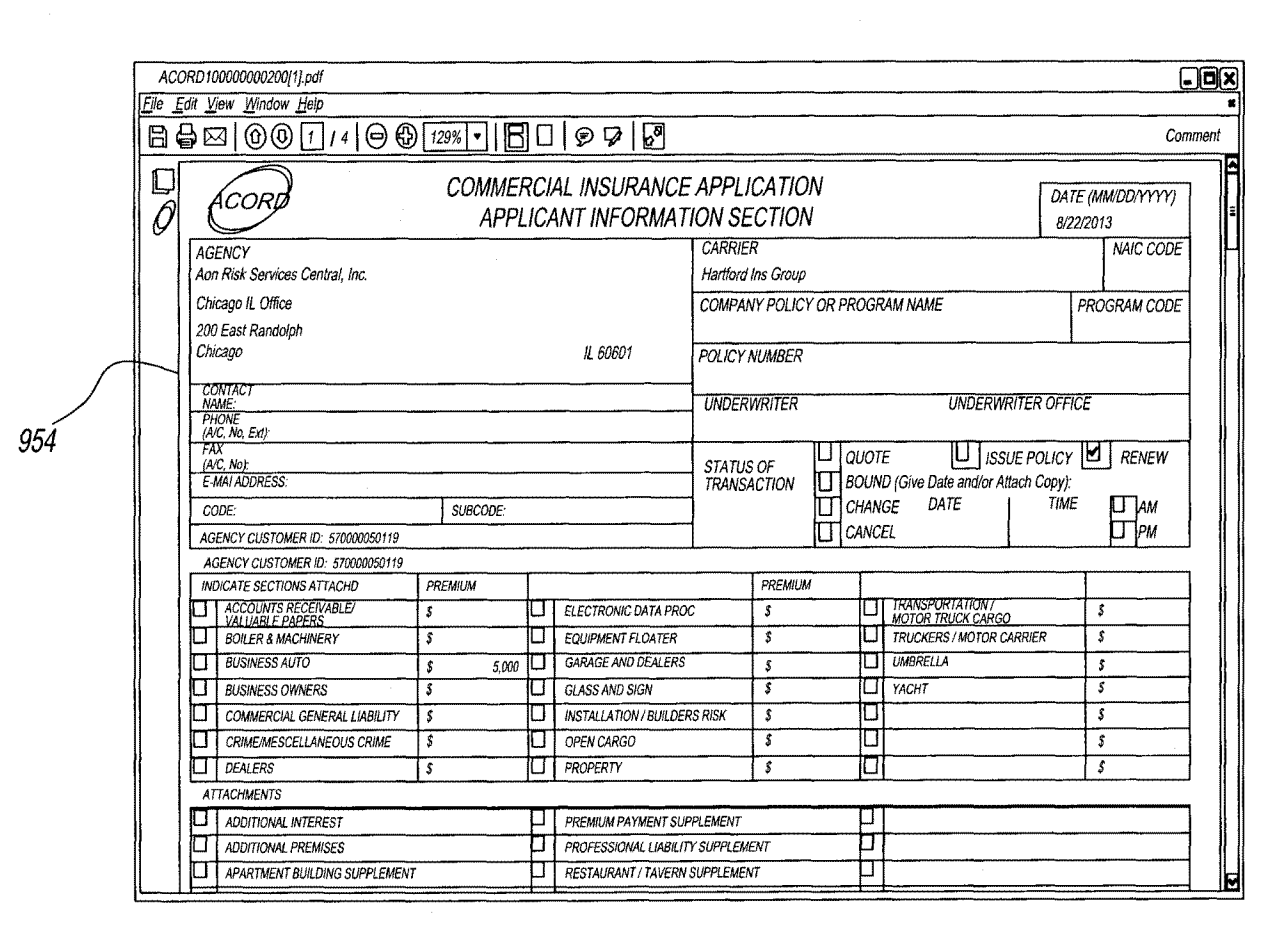

As shown in FIG. 15, the broker can create (see "create submission" selection 950) and deliver submissions from the application 100 to various insurance carriers 952 via an electronic exchange such as Microsoft's Outlook. FIG. 16 illustrates a completed submission 204 in PDF output form. In addition to delivering a submission via email, a submission may also be delivered and received via a network connection as a file in submission extensible markup language.

Figure 17:
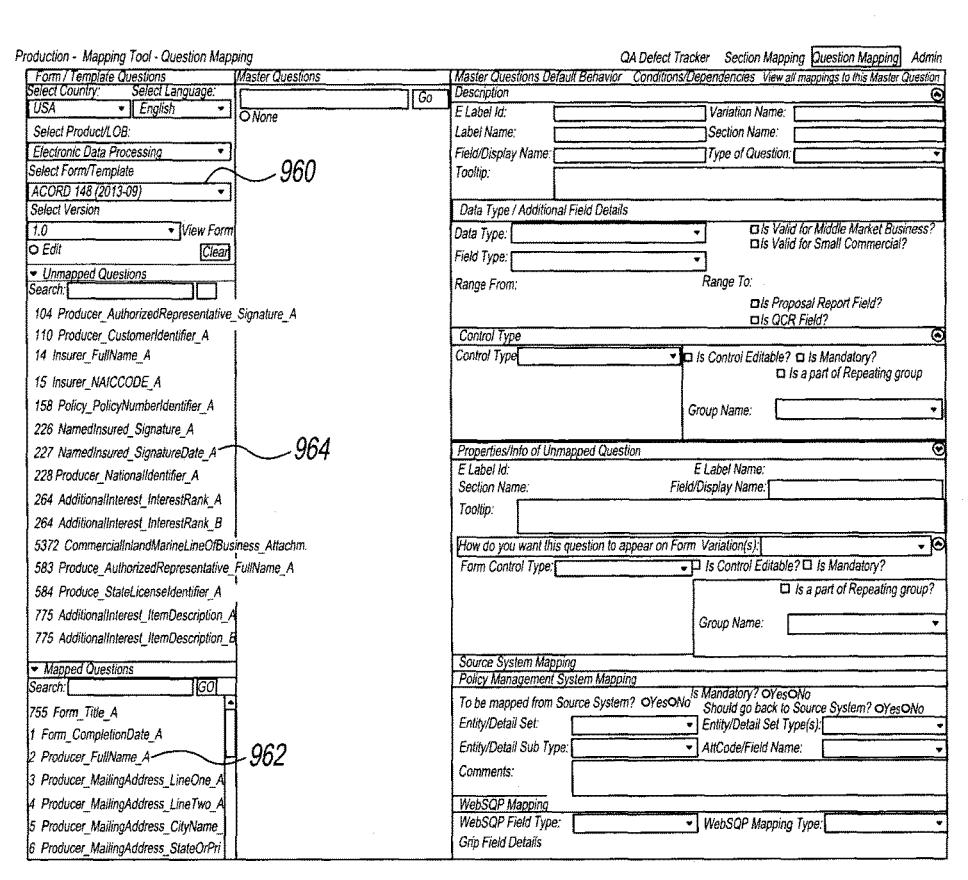

Referring to FIG. 17, once a new version of ACORD form is uploaded in mapping tool, it analyzes the e-Labels and their corresponding mappings (see e.g., field 960). All the questions mapped in the prior version are re-mapped automatically (see e.g., field 962). New questions are displayed in "Unmapped Questions" section 964 for user to complete the configuration.

Figure 18:
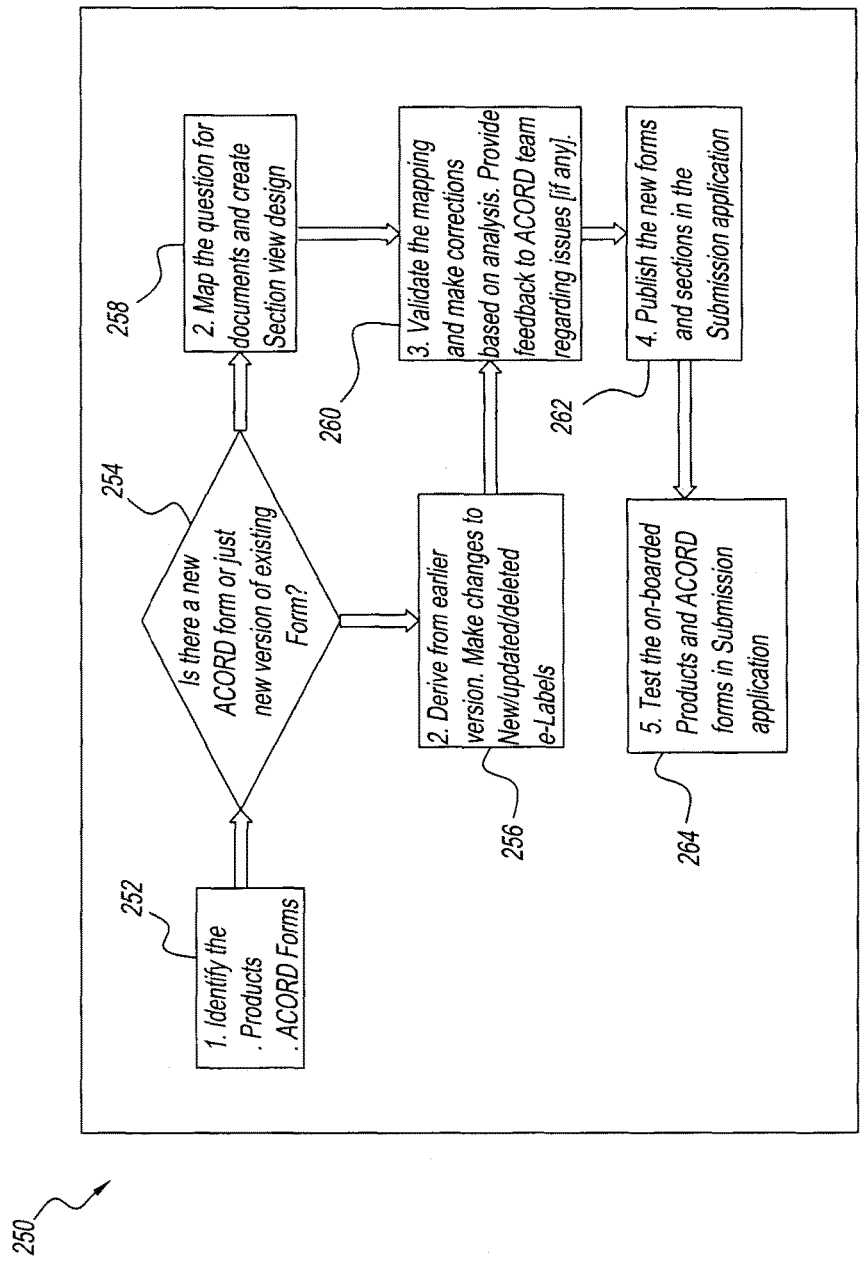
FIG. 18 illustrates an example process for onboarding new eForms in accordance with a disclosed embodiment.

One key feature of the disclosed technology is its ability to onboard new versions of ACORD eForms for all products in a quick and efficient manner upon their release by the ACORD organization. FIG. 18 illustrates an example process 250 for onboarding new eForms in accordance with a disclosed embodiment. The process 250 begins by identifying the products and corresponding eForms used by the application 100 in the step identified at 252. In the next step, which is identified at 254, it is determined whether there is a new ACORD eForm as opposed to a new version of an existing eForm. If there is a new version, the process 250 continues to another step, as identified at 256, wherein data is derived from the prior version of the eForm, and changes are made to the new/updated/deleted eLabels. The process 250 then continues to another step as identified at 260. If at step 254, it is determined that a new eForm is associated with the product, the process 250 continues to another step, as shown at 258, where the questions for the new form are mapped and a section view is created. The process 250 then continues at the step identified at 260 which involves using process 220 to validate the mapping of step 256 or 258, and makes any needed corrections based on the analysis. The new eForm(s) are published to the application 100 as shown at step 232 and then tested as shown at the final step, identified at 234, which ensures that there are no issues with the new eForms.

It should be appreciated that the automated technique disclosed herein will benefit clients seeking insurance coverage, insurance carriers and insurance brokers. For example, clients will see improvements in policy renewal cycle time and quality, while the shorter cycle time will insure more rapid contract certainty. The efficiencies gained in exchanging information digitally will allow for greater exposure to more markets, while on-line collaboration and automation can help clients be more effective in their participation in the process. Carriers can better manage deal flow and interact with brokers at an organization level rather than local level to drive shorter cycle times, increased collaboration between entities and expanded new business opportunities. The data exchange of information in standard format will lower processing costs through reduced manual inputs and improved straight-through-processing with fewer inquiries and follow-ups. Brokers will benefit from greater collaboration with both clients and underwriters allowing the brokers to re-allocate resources to client facing and complex underwriting activities. The automation created by this process will lead to improved cycle times and reduced frustration for all industry constituents.

Figure 19:
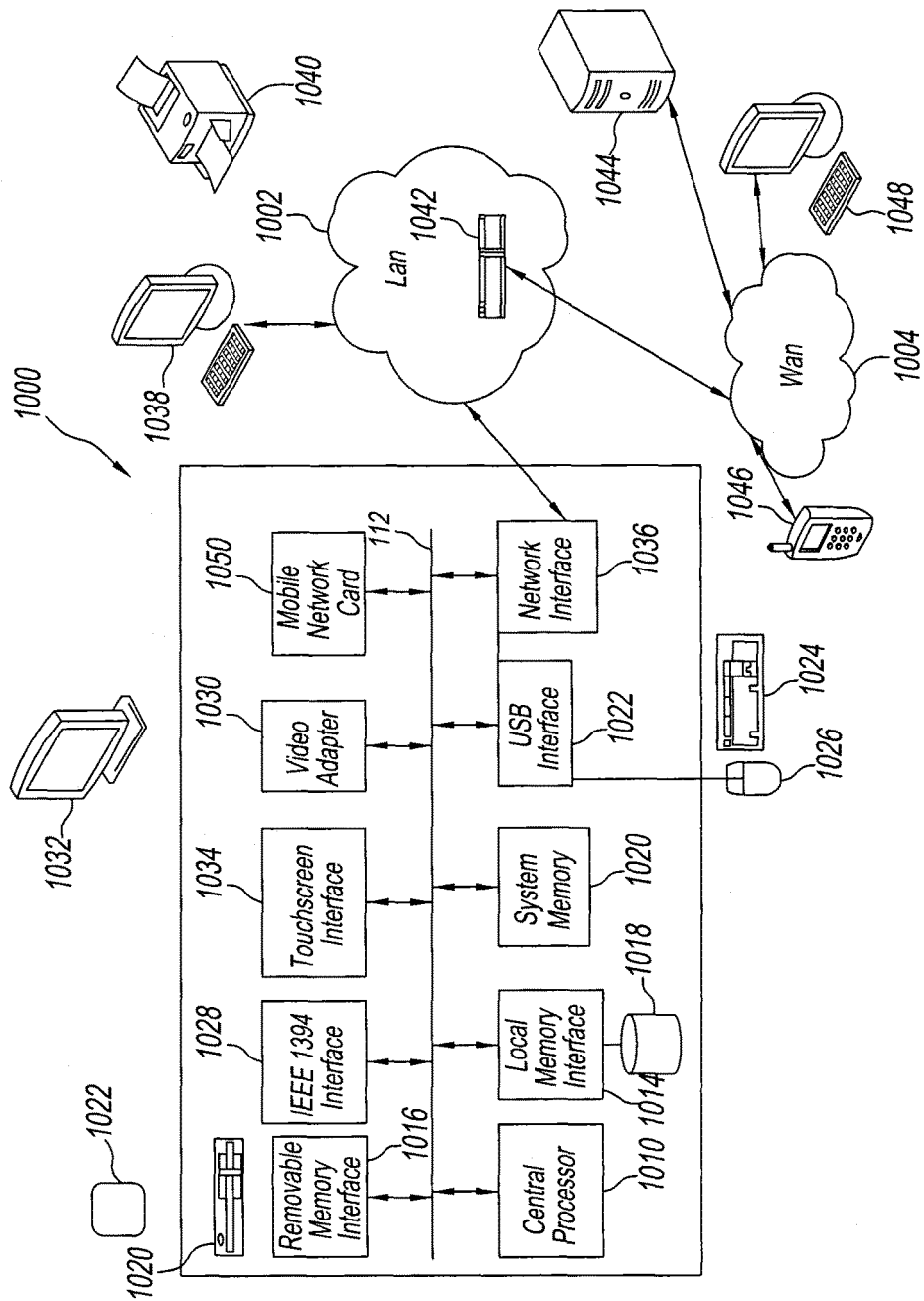
FIG. 19 illustrates an example computer system for hosting the application disclosed herein.

Various examples of the present technology may be implemented with computing device devices, computing device networks and systems that exchange and present information. Elements of an exemplary computing device system are illustrated in FIG. 19, in which the application is provided to a user by a computing device 1000. Computing device 1000 can be connected to a local area network (LAN) 1002 and/or a wide area network (WAN) 1004. Computing device 1000 can include a central processor 1010 that controls the overall operation of the computing device, and a system bus 1012 that connects central processor 1010 to the components described below. System bus 1012 may be implemented with any one of a variety of conventional bus architectures.

Computing device 1000 can include a variety of interface units and drives for reading and writing data or files. In particular, computing device 1000 can include a local memory interface 1014 and a removable memory interface 1016 respectively coupling a hard disk drive 1018 and a removable memory drive 1020 to system bus 1012. Examples of removable memory drives include magnetic disk drives and optical disk drives that receive removable memory elements 1022. Hard disks generally include one or more read/write heads that convert bits to magnetic pulses when writing to a computing device-readable medium and magnetic pulses to bits when reading data from the computing device readable medium. A single hard disk drive 1018 and a single removable memory drive 1020 are shown for illustration purposes only and with the understanding that computing device 1000 may include several of such drives. Furthermore, computing device 1000 may include drives for interfacing with other types of computing device readable media such as magneto-optical drives.

Unlike hard disks, system memories, such as system memory 1020, generally read and write data electronically and do not include read/write heads. System memory 1020 may be implemented with a conventional system memory having a read only memory section that stores a basic input/output system (BIOS) and a random access memory (RAM) that stores other data and files.

A user can interact with computing device 1000 with a variety of input devices, and through graphical user interfaces provided to the user by the computing device 1000, such as though a browser application. For example, FIG. 19 shows a universal serial bus (USB) interface 1022 coupling a keyboard 1024 and a pointing device 1026 to system bus 1012. Pointing device 1032 may be implemented with a hard-wired or wireless mouse, track ball, pen device, or similar device.

Computing device 1000 may include additional interfaces for connecting peripheral devices to system bus 112. FIG. 19 shows a IEEE 1394 interface 1028 that may be used to couple additional devices to computing device 1000. Peripheral devices may include game pads scanners, printers, and other input and output devices and may be coupled to system bus 1012 through parallel ports, game ports, PCI boards or any other interface used to couple peripheral devices to a computing device.

Computing device 1000 also includes a video adapter 1030 coupling a display device 1032 to system bus 1012. Display device 1032 may include a cathode ray tube (CRT), liquid crystal display (LCD), field emission display (FED), plasma display or any other device that produces an image that is viewable by the user. A touchscreen interface 134 may be included to couple a touchscreen (not shown) to system buss 1012. A touchscreen may overlay at least part of the display region of display device 1032 and may be implemented with a convention touchscreen technology, such as capacitive or resistive touchscreen technology.

One skilled in the art will appreciate that the device connections shown in FIG. 19 are for illustration purposes only and that several of the peripheral devices could be coupled to system bus 1012 via alternative interfaces. For example, a video camera could be connected to IEEE 1394 interface 1028 and pointing device 1026 could be connected to another interface.

Computing device 1000 may include a network interface 10036 that couples system bus 1012 to LAN 1002. LAN 1002 may have one or more of the well-known LAN topologies and may use a variety of different protocols, such as Ethernet. Computing device 1000 may communicate with other computing devices and devices connected to LAN 1002, such as computing device 1038 and printer 140. Computing devices and other devices may be connected to LAN 102 via twisted pair wires, coaxial cable, fiber optics or other media. Alternatively, electromagnetic waves, such as radio frequency waves, may be used to connect one or more computing devices or devices to LAN 1002.

A wide area network 1004, such as the Internet, can also be accessed by computing device 1000. FIG. 19 shows network interface 1036 connected to LAN 1002. LAN 1002 may be used to connect to WAN 1004. FIG. 19 shows a router 1042 that may connect LAN 1002 to WAN 1004 in a conventional manner. A server 1044. Mobile terminal 1046 and a computing device 1048 are shown connected to WAN 1004. Of course, numerous additional servers, computing devices, handheld devices, personal digital assistants, telephones and other devices may also be connected to WAN 1004.

In some examples, a mobile network card 1050 may be used to connect to LAN 1002 and/or WAN 1004. Mobile network card may be configured to connect to LAN 1002 and/or WAN 1004 via a mobile telephone network in a conventional manner.

The operation of computing device 1000 and server 1044 may be controlled by computing device-executable instructions stored on a non-transient computing device-readable medium. For example, computing device 1000 may include computing device-executable instructions stored on a memory for transmitting information to server 1044, receiving information from server 1044 and displaying the received information on display device 1032. Furthermore, server 1044 may include stored on a memory computing device-executable instructions for, receiving requests from computing device 1000, processing data and transmitting data to computing device 100. In some embodiments server 1044 transmits hypertext markup language (HTML) and extensible markup language (XML) formatted data to computing device 1000.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 1002 and 1004, but also a "content network," which is comprised of the data—attributable to a single entity—which resides across all physical networks.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A system comprising:

processing circuitry; and a non-transitory computer readable memory coupled to the processing circuitry, the memory storing machine-executable instructions, wherein the machine-executable instructions, when executed on the processing circuitry, cause the processing circuitry to:

receive, from a remote computing device of a first party via a network, a submission request for a message associated with a transaction negotiation to be transmitted to at least one other party, wherein the message includes a plurality of submission documents each having a plurality of transaction parameters associated with an identified insurance product, provide, in a first user interface configured for display on a remote computing device responsive to receiving the submission request, a parameter mapping interface configured to allow a user to identify the plurality of transaction parameters, wherein each of the plurality of transaction parameters corresponds to an input field in one or more of the plurality of submission documents, receive, from the remote computing device responsive to providing the parameter mapping interface, the plurality of transaction parameters for the transaction negotiation, associate, within a non-transitory storage medium, each of the plurality of transaction parameters with one or more of the plurality of submission documents, link, within the non-transitory storage medium, at least one of the plurality of transaction parameters between two or more of the plurality of submission documents, wherein the linked transaction parameters share one or more common properties, receive, from a product configuration interface at the remote computing device, inputs for a plurality of input fields each associated with a respective transaction parameter of the plurality of transaction parameters, storing, responsive to receiving the inputs for each of the plurality of input fields, the inputs for each of the linked transaction parameters independently of a corresponding submission document, transform, responsive to receiving the inputs for the plurality of transaction parameters, the message and the plurality of submission documents for the submission request into a standard document transmission format, and transmit, to the at least one remote computing device associated with each party of the at least one other party via the network, the message including the plurality of submission documents in the standard document transmission format.

2. The system of claim 1, wherein the machine-executable instructions, when executed on the processing circuitry, further cause the processing circuitry to:
generate each of the plurality of the submission documents for the message from one of a respective standardized submission form or a respective form template.

3. The system of claim 2, wherein the respective standardized submission form is an Association for Cooperative Operations Research and Development (ACORD) submission form configured in an Extensible Markup Language (XML) format.

4. The system of claim 1, wherein the product configuration interface includes a plurality of display regions, wherein
each of the plurality of display regions is configured to display the plurality of transaction parameters for the identified insurance product in a different format including at least one of
  (a) a section display region configured to display the plurality of transaction parameters in groupings of related transaction parameters,
  (b) a form display region configured to display one or more of the plurality of transaction parameters associated within a standardized submission form for one or more of the plurality of submission documents, and
  (c) a template display region configured to display one or more of the plurality of transaction parameters associated within a form template for one or more of the plurality of submission documents.

5. The system of claim 1, wherein providing the parameter mapping interface further includes providing a parameter configuration tool for each of the plurality of transaction parameters, wherein the parameter configuration tool is configured to allow the first party to customize one or more properties of each of the plurality of transaction parameters.

6. The system of claim 5, wherein one of the one or more properties of each of the plurality of transaction parameters is a customized interface control setting for a respective input field for each of the plurality of transaction parameters within the product configuration interface, wherein the customized interface control setting defines a control behavior and screen rendering properties for the respective input field.

7. The system of claim 6, wherein the machine-executable instructions, when executed on the processing circuitry, further cause the processing circuitry to:
dynamically configure the plurality of input fields within the product configuration interface based on the customized interface control setting for each of the plurality of transaction parameters.

8. The system of claim 7, wherein dynamically configuring the plurality of input fields within the product configuration interface further includes modifying the plurality of input fields displayed within the product configuration interface based on modifications received at the parameter mapping interface.

9. The system of claim 6, wherein the customized interface control setting is a dropdown menu.

10. The system of claim 5, wherein one of the one or more properties of each of the plurality of transaction parameters is an identification code configured to distinguish a respective transaction parameter from other transaction parameters.

11. The system of claim 10, wherein providing the parameter mapping interface further includes providing a parameter linking tool configured to allow the first party to link a respective transaction parameter to a related transaction parameter via the identification code such that the respective transaction parameter inherits the one or more properties of the related transaction parameter.

12. The system of claim 11, wherein providing the parameter linking tool further includes allowing the first party to assign a master transaction parameter from a plurality of linked transaction parameters such that additional linked transaction parameters inherit the one or more properties of the master transaction parameter.

13. The system of claim 5, wherein one of the one or more properties of each of the plurality of transaction parameters is a transaction parameter description configured to assist the first party in identifying the plurality of transaction parameters for the transaction negotiation within the parameter mapping interface.

14. The system of claim 1, wherein the machine-executable instructions, when executed on the processing circuitry, further cause the processing circuitry to:
detect an overflow amount of input characters within an input field of the plurality of input fields of the product configuration interface; and
provide, responsive to detecting the overflow amount of input characters within the input field, at least one additional overflow submission document to the plurality of submission documents, wherein each of the at least one additional overflow submission document includes an overflow input field to accommodate at least a portion of overflow amount of input characters.

15. The system of claim 1, wherein the machine-executable instructions, when executed on the processing circuitry, further cause the processing circuitry to:
identify the at least one other party based at least in part on shared characteristics between the first party and the at least one other party.

16. The system of claim 15, wherein the at least one other party is a provider of the identified insurance product.

17. The system of claim 16, wherein the shared characteristics between the first party and the at least one other party include a risk profile and coverage specifications for the first party and corresponding product offerings by the at least one other party.

18. The system of claim 16, wherein identifying the at least one other party further includes identifying at least one product provider having one or more product policies expiring within a predetermined time frame.

19. The system of claim 1, wherein configuring the message and the plurality of submission documents for the submission request includes inserting the inputs for each of the plurality of input fields at the product configuration interface into respective portions of the plurality of submission documents.

20. The system of claim 1, wherein the machine-executable instructions, when executed on the processing circuitry, further cause the processing circuitry to:
detect, responsive to receiving an uploaded submission document from the remote computing device of the first party, that the uploaded submission document is an updated version of a previous submission document stored within the non-transitory storage medium; and apply, responsive to detecting that the uploaded submission document is the updated version of the previous submission document, the associated transaction parameters for the previous submission document to the uploaded submission document.

\* \* \* \* \*